Patented Apr. 17, 1951

2,549,261

UNITED STATES PATENT OFFICE 2,549,261

CALCIUM SULFATE-EXTENDED TITANIUM DIOXIDE PIGMENTS

Roy W. Sullivan, Wilmington, Del., assignor to E. I. du Pont de Nemours & Company, Wilmington, Del., a corporation of Delaware No Drawing. Application February 21, 1948, Serial No. 10,192

5 Claims. (Cl. 106—300)

This invention relates to the production of novel anhydrous calcium sulfate-extended pigmenting substances, and more particularly to the preparation of a novel anhydrite-extended $TiO_2$ pigment of controlled consistency properties which render it especially useful as an ingredient in coating compositions containing organic vehicles, such as are commonly employed in paints, enamels, lacquers, linoleum, paper, textiles, etc.

Calcium sulfate is a widely-used paint ingredient and is particularly useful as an extender for prime white or colored pigment substances, especially titanium oxide. In forming a calcium base composite titanium pigment, a ratio of about 30% $TiO_2$ and 70% anhydrite is usually employed. Two modes of manufacturing calcium base titanium pigments are resorted to: (1) that involving production of a so-called "coalesced" type of product by initially precipitating the calcium sulfate, adding the precipitate to a titanium sulfate solution, hydrolyzing said solution in the presence of said precipitate, and calcining, at a temperature of about 1000° C., the resulting composite product, after its separation from acid and other impurities present at the time of the hydrolysis; and (2) the precipitation of insoluble anhydrite by interacting lime and strong sulfuric acid, admixture of this precipitate in the desired proportions with a previously-calcined titanium oxide pigment, followed by the calcination of the mixture to improve its value as a pigmenting material. The pigments resulting from both of these processes are quite similar, since in both instances the calcium sulfate is precipitated as insoluble anhydrite and is then calcined to make it more stable and give it other desirable pigmentary characteristics.

Calcium sulfate-containing pigments are used extensively in flat wall paint manufacture. Paint producers often thicken such paints by adding thereto small amounts of water. Calcium sulfate is readily wetted by water and in addition is slightly soluble therein. Solutions of calcium salts are valuable as flocculating agents, and paints containing calcium sulfate become much thicker on the addition of water than similar paints in which this compound is absent. This thickening characteristic which calcium sulfate manifests in the presence of moisture is so strong that in many instances an undue thickening will occur, especially when preparing the paints in damp weather. This disadvantageous characteristic of calcium sulfate-containing pigments has proven quite troublesome to paint manufacturers, especially during the humid summer season.

It is among the primary objects of this invention to overcome this characteristic irregularity in the behavior of calcium sulfate-containing pigments when in the presence of moisture, as well as to eliminate other inherent disadvantages of such pigments. A further object is to provide a composite calcium sulfate pigment which will be free from any tendency to thicken abnormally when paints are prepared therefrom in the presence of small amounts of water. An additional object is to provide a novel form of porous type anhydrite-extended $TiO_2$ pigment which possesses the desired characteristics of readily absorbing small amounts of water present in organic paint or other coating composition vehicles and with which the pigment must be associated when in use, to the end that the deleterious effect which moisture presence might otherwise exert will be completely overcome or at least effectively minimized. It is among the particular objects of the invention to provide a novel anhydrite-extended $TiO_2$ pigment having the much-desired attribute of readily imparting certain essential consistency values to coating compositions containing the same. Further objects and advantages of the invention will be apparent from the following more detailed description:

These and other objects are readily attainable in this invention which comprises precipitating calcium sulfate in the form of relatively small gypsum crystals, heating said gypsum product at a controlled temperature to drive off its combined water content and convert said product to a porous type anhydrite product of increased surface area, blending said calcium sulfate with a titanium dioxide pigment of fully developed pigment properties, and grinding the resulting blend in a pressure pulverizing mill followed by further grinding in a fluid energy mill.

The invention will be described as applied to its preferred adaptation which involves the production of an improved calcium sulfate-extended titanium oxide pigment containing approximately 70 parts $CaSO_4$ for each 30 parts of $TiO_2$. Conveniently, the gypsum ($CaSO_4 \cdot 2H_2O$) calcium sulfate starting material of this invention may be obtained by adding a lime ($Ca(OH)_2$) slurry, calcium oxide, calcium carbonate, or other easily-decomposable calcium compound to dilute sulfuric acid. The sulfuric acid may comprise a relatively pure water white product, or may comprise the residual product from a titanium sulfate hydrolysis operation. Its strength must be considerably below that of the usual acid of commerce (below 50% and usually between 10% and 30% strength) to insure the formation of gypsum crystals, to avoid high reaction temperatures, as well as to control the particle size of said product and that of the final porous anhydrite material. A very suitable and preferred acid for this purpose comprises the weak acid liquors produced from the hydrolysis of titanium sulfate solutions in a $TiO_2$ pigment-producing operation. Such residual liquors contain from about 10% to 35% $H_2SO_4$ with minor amounts of titanium salts and usually substantial amounts of iron salts and other impurities, the presence of which in small amounts is not harmful but advantageous since they assist in maintaining relatively small size gypsum.

In utilizing this weak residual acid liquor, neutralization of about 80% to 90% of its free acid content is effected by slowly adding the lime slurry thereto, following which the gypsum suspension is removed from the ferrous sulphate solution by suitable filtration. The recovered gypsum product is then heated at such temperature as will insure removal of combined water and production of the desired increased-surface-area, porous anhydrite material. It has been found that the temperatures used in such heating are critical in nature and that a temperature of at least 600° C. and not to exceed 825° C. must be resorted to, in order to obtain a porous product having the properties found so effective in producing paints having a high pigment:binder ratio. The porous anhydrite product which results is then wet-mixed or dry-blended in the desired proportions with a suitable $TiO_2$ product, as for instance the $TiO_2$ obtained in accordance with the methods described in U. S. Patents 2,062,133; 2,342,483 and Reissue Patents 18,854 and 18,790, and which has been previously calcined to develop such essential properties as color, tinting strength, hiding power, oil absorption, etc. A preferred pigment is produced by blending the thus-obtained porous anhydrite with a titanium pigment, such as is obtained by the practice of the process of U. S. Patent 2,046,054 and comprising precipitated anhydrite which has been subsequently calcined.

The critical nature of the treating temperature used and its effect upon the character of the ultimate calcium sulfate product is best revealed from a consideration of specific surface area measurements. "Specific surface area" has been used as a measure of the particle size of a pigment material and is conveniently determined by the method outlined by Professor Emmett of the Johns Hopkins University in the January 15, 1941, Analytical edition issue of Industrial and Engineering Chemistry. This method depends on adsorption of a gas on the particle surface and is believed to be sufficiently reliable to supply a direct measure of the amount of surface exposed by materials of pigment fineness.

The specific surface area of the calcium sulfate component of calcium base titanium pigments has been found to vary from 4–7 square meters per gram by the aforesaid Emmett method. The surface area has been found to be in the lower part of this range when one is examining thin consistency pigments, and figures of the order of 6–7 square meters per gram are obtained when examining calcium base pigments which impart thick consistency properties to paints. In contrast to the values which are obtained for the prior art calcium sulfate, the improved calcium sulfate of this invention will show values as high as 9 or 10 square meters per gram even after a calcination treatment of 600° C. The exact value will depend on the fineness of the gypsum as precipitated, and also on the temperature used in the heat treatment. The relationship between surface area and temperature is shown in the following data which were obtained on a relatively coarse gypsum (still in the pigment-useful range of particle size) after heating at temperatures ranging from 200° C. to 1000° C.:

| | Square meters per gram |
|---|---|
| 200° | 5.91 |
| 400° | 8.60 |
| 600° | 7.04 |
| 800° | 6.96 |
| 825° | 6.75 |
| 850° | 4.51 |
| 900° | 3.52 |
| 1000° | 3.30 |

These data show that the surface area increases as the gypsum is heated to about 400° C., due to the formation of porous calcium sulfate particles, and the area then decreases when this porous characteristic is lost as more drastic heating conditions are used.

From the above tabulation, it is evident that calcination temperatures ranging up to about 825° C. provide products exhibiting relatively high surface area values and consequent porous character, whereas those products obtained upon using temperatures above about 825° C. give values indicative of the absence of desired porosity. The calcium sulfate prepared by the calcination of gypsum below 600° C., say, about 500° C., while porous and exihibiting about the same surface area values as that heated or calcined at a higher temperature, is not well suited for admixture with titanium dioxide pigment in substantial amounts because of its poor mixing properties. For instance, the product obtained by heating gypsum at 400° C. and blending same with titanium dioxide or another titanium pigment possesses poor mixing properties in linseed oil and other paint vehicles. This point will be further discussed in this disclosure.

The improved character of the novel pigment of this invention is especially evident from its water-sensitivity or consistency-imparting properties when incorporated in coating vehicles, particularly flat wall types of paints. The "consistency" of pigments and of paints manufactured therefrom refers to the resistance which such products exhibit toward deformation or flow. Consistency values are readily determined through means of a Stormer viscometer, a device which measures the consistency of a material by the speed of a rotating member immersed in the material. A description of the device, with an explanation of a method for determining consistency measurements by its use, appears at page 221 of Gradner's "Physical and Chemical Examination of Paints, Varnishes, Lacquers, Color," 9th edition, 1939.

The following examples are illustrative of more specific, commercial applications of the invention. However, it is not to be construed as limited thereto:

EXAMPLE I 8,000 gallons of recovered sulfuric acid resulting from the separation of titanium sulfate hydrolysate in a $TiO_2$ pigment-producing system and containng about 125 grams of free $H_2SO_4$ per liter were partially neutralized in a suitable reaction vessel with a lime slurry containing 60 grams of CaO per liter. In this partial neutralization the lime slurry was introduced into the acid at the rate of about 100 gallons per minute through a line carrying about 30 lbs. pressure extending to the bottom of the vessel and in such manner as to insure thorough distribution of the lime slurry throughout the acid body which is kept in motion by strong agitation. As soon as the acid concentration was reduced to about 20 grams of free sulfuric acid per liter, further amounts of acid were added to the vessel in the form of a continuous stream. Lime was also added in a continuous stream, and the rate of addition of these two reagents was so regulated that the tank was filled with a gypsum suspension analyzing about 20 grams of free sulfuric acid per liter. This continuous and simultaneous addition of the reagents was interrupted when the tank, having a capacity of 20,000 gallons, became filled. The finely-divided gypsum precipitate was filtered, washed free of acid, and thereafter was collected in a storage tank, using a minimum amount of water to maintain a flowing slurry. This slurry was then treated with a lime slurry in an amount sufficient to give 5 parts of CaO per 1,000 parts of gypsum. After thorough incorporation of the lime, the product was filtered and calcined for about 30 minutes at 700° C. until the desired porous type product resulted.

A calcium base titanium pigment exhibiting low water-sensitivity was produced from this calcined gypsum by blending the same with a prior art calcium base titanium pigment and pigment titanium dioxide using 35 parts of calcined gypsum, 15 parts of pigment titanium dioxide, and 50 parts of a prior art calcium base pigment. This blend was then passed through a series of mills consisting of a ring roller mill and a fluid energy mill. The former was a four roll Raymond mill while the latter was the type of mill described in U. S. Patent 2,032,827, wherein the energy was supplied by steam preheated to about 500° C. at 120 pounds pressure. The resulting pigment analyzed 70% anhydrous calcium sulfate and 30% titanium dioxide and was found to be non-water-sensitive when used in the preparation of paints under high humidity conditions when using the flat paint formulation disclosed above, whereas the prior art calcium base pigment which was used in the blend gave highly unsatisfactory conditions when used in the same paint formulation and under the same humid conditions.

EXAMPLE II

Finely-divided gypsum was prepared in the equipment described in Example I by first placing in the tank 8,000 gallons of recovered sulfuric acid containing residual ferrous sulfate, a lesser amount of titanium sulfate, and about one pound of free $H_2SO_4$ per gallon of the acid. 85% of the free acid was neutralized by the addition of 9,700 gallons of a hydrated lime slurry containing approximately 0.4 pound CaO per gallon. The resulting suspension was pumped to filters where the solid material was separated from the sulfate liquor and washed. The resulting gypsum cake was dried and heated to temperatures ranging from 200° C. to 1000° C., after which portions were blended with rutile pigment titanium dioxide, intensively ground by passage through a four roll ring roller mill and then through a fluid energy mill using 125 pounds pressure preheated steam as a source of energy. The products were then tested for water-sensitivity and consistency-imparting properties in a flat wall paint composition of the following formula:

|  | Weight per cent |
|---|---|
| Calcium base titanium pigment | 54.0 |
| Precipitated $CaCO_3$ | 11.7 |
| 65% rosin in mineral spirits | 4.7 |
| Heavy fish oil | 7.1 |
| Raw linseed oil | 4.3 |
| Mineral spirits | 18.2 |
|  | 100.0 |

The pigment and extender materials were mixed with the rosin solution, fish oil and raw linseed oil in a change can mixer until a uniform paste was secured. This was then ground over a three-roller mill with a mill clearance of .003″. The ground paste was then collected and reduced to the proper consistency by addition of the mineral spirits and portions placed in 5 small cans. To four of the cans of paint, water was added using ⅛%, ¼%, ½% and 1% of water, respectively, the percentages being based on the weight of calcium base titanium pigment present in the paint. The paint and water were then stirred until complete thickening had occurred and the consistency was measured on a Stormer viscometer. The blends were made with rutile titanium dioxide using 30 parts of this pigment and 70 parts of the calcium sulfate. A similar flat wall paint was made using prior art calcium base titanium pigment in which the calcium sulfate was precipitated as anhydrite, after which it was heated or calcined in accordance with the usual practice of the prior art. Each of the six paints was tested for consistency before addition of the water and after said ⅛%, ¼%, ½% and 1% additions of water (percentage based on the calcium sulfate pigment content of the paint). The data are shown in the table which follows:

*Consistency data*

|  | 0% $H_2O$ | ⅛% $H_2O$ | ¼% $H_2O$ | ½% $H_2O$ | 1% $H_2O$ | Mixing properties |
|---|---|---|---|---|---|---|
| $CaSO_4$ heated to 200° C.+$TiO_2$ | 70 | 78 | 90 | 110 | 130 | Very Poor. |
| $CaSO_4$ heated to 400° C.+$TiO_2$ | 70 | 66 | 69 | 69 | 78 | Poor. |
| $CaSO_4$ heated to 500° C.+$TiO_2$ | 69 | 68 | 69 | 70 | 80 | Do. |
| $CaSO_4$ heated to 600° C.+$TiO_2$ | 69 | 69 | 70 | 72 | 82 | Satisfactory. |
| $CaSO_4$ heated to 800° C.+$TiO_2$ | 69 | 73 | 75 | 81 | 87 | Good. |
| $CaSO_4$ heated to 825° C.+$TiO_2$ | 70 | 72 | 76 | 85 | 90 | Do. |
| $CaSO_4$ heated to 850° C.+$TiO_2$ | 70 | 70 | 85 | 102 | 128 | Do. |
| $CaSO_4$ heated to 1000° C.+$TiO_2$ | 70 | 70 | 88 | 105 | 132 | Do. |
| Prior Art Anhydrite Pigment | 69 | 79 | 136 | Thick | Thick | Do. |

EXAMPLE III

Gypsum of small particle size was precipitated in a continuous operation which comprised simultaneously adding a lime slurry containing 5% CaO and a sulphuric acid recovered from titanium pigment operations containing 200 grams $H_2SO_4$ per liter into an 8,000 gallon tank. The rate of addition of the two reactants was regulated so that there remained 20 grams of free $H_2SO_4$ per liter in the resulting gypsum slurry. The tank was allowed to overflow and the overflow was fed to a vacuum drum filter. The resulting filter cake was repulped in water with the addition of about 5 grams of virgin sulphuric acid per liter, and this repulped slurry was again filtered on a vacuum drum filter. This filter discharge was again repulped with adjustment of the alkalinity to about .15 part CaO per 100 parts $CaSO_4$. This slurry was then dewatered on a drum filter feeding a continuous rotating kiln. The gypsum was heated in the latter to a temperature of about 750° C. which converted it from gypsum to a porous type anhydrite.

The kiln discharge was thoroughly mixed with high quality rutile type pigment as obtained directly from the calcination step in the titanium dioxide operation using 30 parts by weight of the rutile to 70 parts by weight of the anhydrite. This blend was passed to grinding operations which permitted passage through a ring roller mill (Raymond mill) through a fluid-energy mill (micronizer) or through a combination of the two mills, the fluid-energy being the final grinding step. Samples were taken from the operations, the first of which represented the product which had been roller milled only, the second, that which had been micronized only, and the third, material which had been passed through both mills in series. These pigments were examined for fineness on a 325 mesh screen, for tinting strength, for hiding power, for gloss and for paint film fineness. In carrying out the milling operation, a large commercial 4 roll Raymond mill was used and the feed to the milling system was maintained throughout the tests at a 4500 pound per hour rate. The fluid-energy mill was a 30″ micronizer to which were fed 4500 pounds of steam per hour at a temperature of 500° C. and a pressure of 120 pounds.

The data are presented in the table below, and it is to be noted that the product which passed through both mills is far superior to the product which received only one milling treatment:

|  | Roller mill | Micronizer | Both mills |
|---|---|---|---|
| Residue on 325 mesh | .39% | .01% | .003%. |
| Tinting Strength | 220 | 230 | 251. |
| Hiding Power | Deficient | Deficient | Standard. |
| Gloss | Poor | do | Do. |
| Film Fineness | do | do | Do. |

As already mentioned, the calcium sulfate prepared by this process is characterized by a high ratio of specific surface area to particle size. This is attributed to the porous character of the sulfate particles. This paint ingredient is hydrophilic in character, and it is quite likely that the product of this invention removes any water present in the organic paint vehicle by absorbing the same within its pores to eliminate thickening due to the water present. The above data show that the specific surface area decreases very rapidly at temperatures in excess of about 825° C., and the value of the pigment in the elimination of water sensitivity also drops off in the same manner. The particles are also believed to grow in size with such high temperature treatment, and accordingly the utility of the invention is nullified when a temperature in excess of about 825° C. is used. The data in the table above also show that the calcium sulfate which is heat treated below about 600° C. shows poor mixing properties, and for this reason the product which has not been calcined at 600° C. or above is not commercially attractive. It therefore follows that the temperature range of 600–825° C. produces the calcium sulfate useful in this invention and giving the desired results.

The superiority of the product of my invention, particularly in respect to improved texture and tinting strength over prior art pigments, is attributed in large measure to the nature of the pigment particles themselves, i. e., that they have a high ratio of specific surface area to particle size, and the assistance to the $TiO_2$ grinding operation which the presence of the calcium sulfate prepared in accordance with my invention affords. The novel properties exhibited by the calcium sulphate is due to the dehydration of the gypsum particles, which leaves somewhat porous calcium sulphate particles. The further processing thereof by the double milling operation in the presence of rutile, as shown particularly in Example III, induces further desired modifications to these particles, first by the intensive grinding in a pressure pulverizer (ring roll mill) and subsequently by the additional intensive grinding in a fluid-energy mill, and, as noted, assists in the $TiO_2$ grinding to provide a final calcium base $TiO_2$ pigment possessing greatly improved tinting strength and texture properties. It is understood that the pressure pulverizer may be one of several different machines; specifically, one may substitute a Chaser or an edge runner mill for the ring roll mills. The latter are generally used in the pigment industry and are generally preferred. The fluid-energy mills are circular mills, with the energy supplied by high pressure gaseous fluid such as steam admitted through a circular manifold to create a swirling vortex within the manifold or grinding chamber. Intensive grinding occurs and this mill greatly improves the already altered calcium sulphate containing pigment which has been pressure pulverized in the ring roll mill.

The calcium sulfate as produced in accordance with this invention, though preferably comprising a part of the composite pigment, as already explained, may be used directly, if desired, as a high-grade filler in paints and other coating compositions. It is possible to obtain a superior extended pigment by blending the precipitated gypsum with finely-ground pigment titanium dioxide, either rutile or anatase, in the usual or any desired proportion and subsequently heat-treating the mixture to obtain the porosity and to effect stabilization of the calcium sulfate at the critical temperatures specified. Alternatively, composite calcium base titanium pigments may be obtained by separately heat treating the calcium sulfate and then blending the improved calcium sulfate with titanium dioxide; or an improved pigment may be obtained as in the instance of Example I from gypsum, and then blended with prior art calcium base titanium pigment and further quantities of titanium oxide. The procedure for obtaining a superior calcium base pigment is therefore very flexible and the manufacturer may pick a procedure which best fits in with his plant equipment.

Calcium base titanium pigments usually contain 70% calcium sulfate, and this may be in admixture with either rutile titanium dioxide or anatase titanium dioxide. While the benefits of this invention will be obtained when all or a portion of this calcium sulfate is made by the heat treatment of finely-divided gypsum at a temperature within the range of 600-825° C., it is usually desirable and preferable to have at least 25 parts of calcium sulfate derived from gypsum in the final pigment product while the other 45 parts of calcium sulfate may be derived from precipitated anhydrite. When using such a calcium sulfate blend, the paint should not thicken greatly when ground under humid weather conditions or when up to about 1 part H2O has been added to the paint for each 400 parts of calcium sulfate. It is, therefore, possible to completely avoid undesirable thickening and particularly lack of control of thickening during the grinding operation and yet to obtain a paint which will properly thicken through the addition of water, after the grinding of the paint has been completed. Some paint manufacturers may wish a pigment which is highly non-water-sensitive, while other manufacturers may want a paint which will not be sensitive during the grinding operation but which can be thickened with a minimum amount of water subsequent to the preparation of the paint. This invention makes these variations possible by a variation in the heat treatment or by a variation in the amount of calcium sulfate prepared from gypsum and the amount prepared from anhydrite.

Paints which are prepared from the improved calcium sulfate-containing pigment material of this invention exhibit better ghosting properties when used in tinted paints. Ghosting may be defined as a difference in appearance occurring when tinted flat paints are applied uniformly to a surface of non-uniform porosity. This improved behavior is not well understood, but definite advantages for the present calcium sulfate have appeared when used over non-uniform porous surfaces.

Calcium base titanium pigment containing the present improved calcium sulfate shows better lampblack undertone than is shown by compositions containing calcium sulfate prepared from precipitated anhydrite. It is common practice in the paint industry to determine the cleanness of tint which a white pigment imparts when formulated in a colored paint by blending it with lampblack to a shade of gray. The most desirable white pigment will impart a clean blue-black shade for undertone, whereas an undesirable white pigment will exhibit a dirty or yellow undertone. Extended pigments of this invention show cleaner and bluer tints with lampblack than do prior art pigments made from precipitated anhydrite according to this test.

This application is a continuation-in-part of my co-pending application Serial Number 574,831, filed January 26, 1945, and now abandoned.

I claim:

1. In a process for the production of an improved hydrophilic composite pigment comprising insoluble anhydrite calcium sulfate and rutile titanium dioxide, the steps of subjecting finely divided gypsum to a temperature between 600° C. and 825° C. until conversion to a porous anhydrite form of calcium sulphate results, blending said anhydrite with pigmentary titanium dioxide in the rutile crystalline form and subjecting the resulting mixture to dual grinding treatment consisting of pressure pulverization followed by fluid energy milling.

2. A process for the production of an improved hydrophilic calcium sulphate base rutile titanium pigment which comprises forming gypsum in a finely divided condition by reacting dilute sulphuric acid with lime, subjecting the gypsum to a temperature of between 600° C. and 825° C. to convert the same to porous anhydrite, blending said anhydrite with calcined pigment grade rutile titanium dioxide and subjecting the mixtures to intensive grinding treatment consisting of pressure pulverization followed by fluid energy milling using high pressure steam as the energy source.

3. A process for obtaining a water-insensitive calcium sulphate base rutile titanium pigment which comprises mixing lime and an excess of residual 10-35% strength sulphuric acid recovered from the hydrolysis of a titanium sulphate solution, separating the finely divided gypsum product from the precipitation medium, subjecting the said gypsum product to a temperature between 600° C. and 825° C. to convert the calcium sulphate to a porous form of anhydrite, blending the latter with pigment quality rutile titanium dioxide and subjecting the mixture to intensive grinding in a pressure pulverization followed by treatment consisting of fluid energy milling using high pressure steam as the source of energy.

4. A process for producing an improved hydrophilic calcium sulphate base rutile TiO2 pigment containing water insensitive porous anhydrite calcium sulfate characterized by a high ratio of specific surface area to particle size, comprising precipitating gypsum of controlled small particle size by interacting a calcium compound with a dilute sulphuric acid solution until 89-90% of the acid content of said solution becomes neutralized; subjecting the resulting gypsum product to calcination treatment at a temperature between 600° C. and 825° C. until said gypsum is converted to porous anhydrite, blending said anhydrite product with rutile titanium oxide pigment and subjecting the resulting mixture to intensive grinding treatment consisting of pressure pulverization followed by fluid energy milling using high pressure steam as the source of energy.

5. A method for producing an improved hydrophilic calcium sulfate-extended rutile titanium oxide pigment containing water-insensitive porous anhydrite calcium sulfate characterized by a high ratio of specific surface area to particle size which comprises precipitating gypsum by slowly adding a calcium hydroxide lime slurry to dilute sulfuric acid containing from about 10-35% H2SO4, continuing said addition until neutralization of about 80%-90% of the free acid content of the sulfuric acid becomes effected, subjecting the recovered gypsum product from said naturalization to calcium treatment at a temperature of at least 600° C. to not to exceed 825° C. until said gypsum is converted to porous anhydrite calcium sulfate, blending said porous anhydrite product with pigmentary rutile titanium oxide in the ratio of 30 parts by weight of the latter to 70 parts by weight of the anhydrite and subjecting the resulting mixture to intensive grinding treatment consisting of pressure milling, followed by fluid energy milling using high pressure steam as the source of energy.

ROY W. SULLIVAN.

REFERENCES CITED

The following references are of record in the file of this patent:

UNITED STATES PATENTS

| Number | Name | Date |
|---|---|---|
| 1,680,316 | Barton et al. | Aug. 14, 1928 |
| 2,052,436 | Wysor | Aug. 25, 1936 |
| 2,177,254 | Heckert | Oct. 24, 1939 |
| 2,220,289 | Saunders et al. | Nov. 5, 1940 |
| 2,284,585 | McCleary | May 26, 1942 |